United States Patent
Rombach (10) Patent No.: US 8,569,922 B2
(45) Date of Patent: Oct. 29, 2013

(54) ELECTRIC MOTOR

(75) Inventor: Volker Rombach, Furtwangen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 324 days.

(21) Appl. No.: 13/150,391

(22) Filed: Jun. 1, 2011

(65) Prior Publication Data

US 2011/0298325 A1 Dec. 8, 2011

(30) Foreign Application Priority Data

Jun. 4, 2010 (DE) .......... 10 2010 023 159

(51) Int. Cl.
*H02K 21/12* (2006.01)
(52) U.S. Cl.
USPC ............. 310/156.53; 310/48; 310/49; 310/56
(58) Field of Classification Search
USPC ............. 310/156.02, 156.15–156.17, 156.19, 310/156.48–156.49, 156.53, 156.56
See application file for complete search history.

(56) References Cited

U.S. PATENT DOCUMENTS

| | | | | |
|---|---|---|---|---|
| 2006/0279154 A1 * | 12/2006 | Tajima et al. | ............ | 310/156.53 |
| 2009/0261677 A1 | 10/2009 | Ishikawa et al. | ......... | 310/156.12 |
| 2010/0026111 A1 | 2/2010 | Monzel | ............................ | 310/59 |

FOREIGN PATENT DOCUMENTS

| | | |
|---|---|---|
| DE | 1036363 | 8/1958 |
| DE | 102005-048731 | 4/2007 |
| DE | 102006-056882 A | 9/2007 |
| DE | 102006-044965 A | 4/2008 |
| DE | 102006-044963 A | 6/2008 |
| DE | 102007-029719 A | 8/2008 |
| DE | 102008041660 A1 * | 3/2010 |
| WO | WO 2008-092748 A | 8/2008 |

* cited by examiner

*Primary Examiner* — Tran Nguyen
*Assistant Examiner* — Jose Gonzalez Quinones
(74) *Attorney, Agent, or Firm* — Milton Oliver, Esq.; Oliver Intellectual Property (57) ABSTRACT

A novel electric motor rotor structure, particularly desirable for use with brittle rare-earth-magnets, offers improved resistance to rattling and axial shifting. This is achieved by forming the rotor with an annular central yoke connecting to a plurality of pole shoes along the periphery of the rotor and defining a magnet-receiving recess or pocket 160 between each pole shoe and the central yoke. Spaced circumferentially between adjacent magnets 38 are regions 146 of reduced magnetic conductivity, which include relatively thin metallic holding segments, which connect adjacent pole shoes to each other and to the central yoke. During manufacturing, tools are applied to upset or crimp the holding segments, and thereby form spring elements, to hold the magnets in stable positions and resist any tendency of the magnets to rattle or axially shift during motor operation. One obtains the same power level from a smaller, and therefore lighter, motor than was previously possible.

12 Claims, 9 Drawing Sheets

Fig. 1 PRIOR ART

PRIOR ART

ELECTRIC MOTOR

CROSS-REFERENCE

This application claims priority of my German application DE 10 2010 023 159.2, filed 4 Jun. 2010, the content of which is incorporated by reference.

FIELD OF THE INVENTION

The present invention relates generally to an electric motor whose rotor includes permanent magnets and, more particularly, to an improved structure for mounting the magnets within the rotor. This motor is preferably implemented as an internal-rotor motor.

BACKGROUND

Because of their low axial moment of inertia, such motors are used for drive situations in which the motions of an electric motor must follow electrical instructions very quickly, for example for fast displacement of parts or for servo-assistance of motions. In a motor of this kind, the permanent magnets must not rattle, and also must not shift in an axial direction.

SUMMARY OF THE INVENTION

It is therefore an object of the invention to make available a novel electric motor structure with improved resistance to rattling and axial shifting.

According to the invention, this is achieved by forming the rotor with an annular central yoke connecting to a plurality of pole shoes along the periphery of the rotor and defining a magnet-receiving recess or pocket between each pole shoe and the central yoke. Spaced circumferentially between adjacent magnets are regions of reduced magnetic conductivity, which include relatively thin metallic holding segments which connect adjacent pole shoes to each other, and to the central yoke. During manufacturing, tools are applied radially inward toward the rotor central axis, to upset or crimp the holding segments and thereby form spring elements, to hold the magnets in stable positions and resist any tendency of the magnets to rattle or axially shift during motor operation. This yields an electric motor in which it is possible to use, in the rotor, ceramic magnets whose angular extent is not much narrower than a pole pitch of the rotor, and in which one obtains a rotationally induced voltage with a good form. This allows the power-to-weight ratio of such motors to be improved; in other words, one obtains the same power level from a smaller, and therefore lighter, motor than was previously possible. The permanent magnets are retained in the rotor, in such a way that they cannot rattle or fall out. This is achieved by the invention in a simple and reliable manner, and also very economically. The invention also permits the use of ceramic magnets having constituents made of rare earths, e.g. neodymium. Such ceramic magnets are brittle and might easily break under mechanical stress, such as stress due to rattling within the rotor. This stress is largely prevented by the invention.

BRIEF FIGURE DESCRIPTION

Further details and advantageous refinements of the invention are evident from the exemplifying embodiments, in no way to be understood as a limitation of the invention, that are described below and shown in the drawings.

FIG. 6 is a section looking along line VI-VI of FIG. 5, in which the permanent magnets are depicted in their assembled position; FIG. 6 is enlarged by comparison with FIG. 5, and also shows a crimping or notching tool 166.

DETAILED DESCRIPTION

In the drawings that follow, identical or identically-functioning parts are labeled with the same reference characters and are each described only once. Terms such as "upper," "lower," "left," and "right" refer to the particular Figure of the drawings. Angles, for example β, are depicted in simplified fashion using arrows and straight lines.

Figure 1:
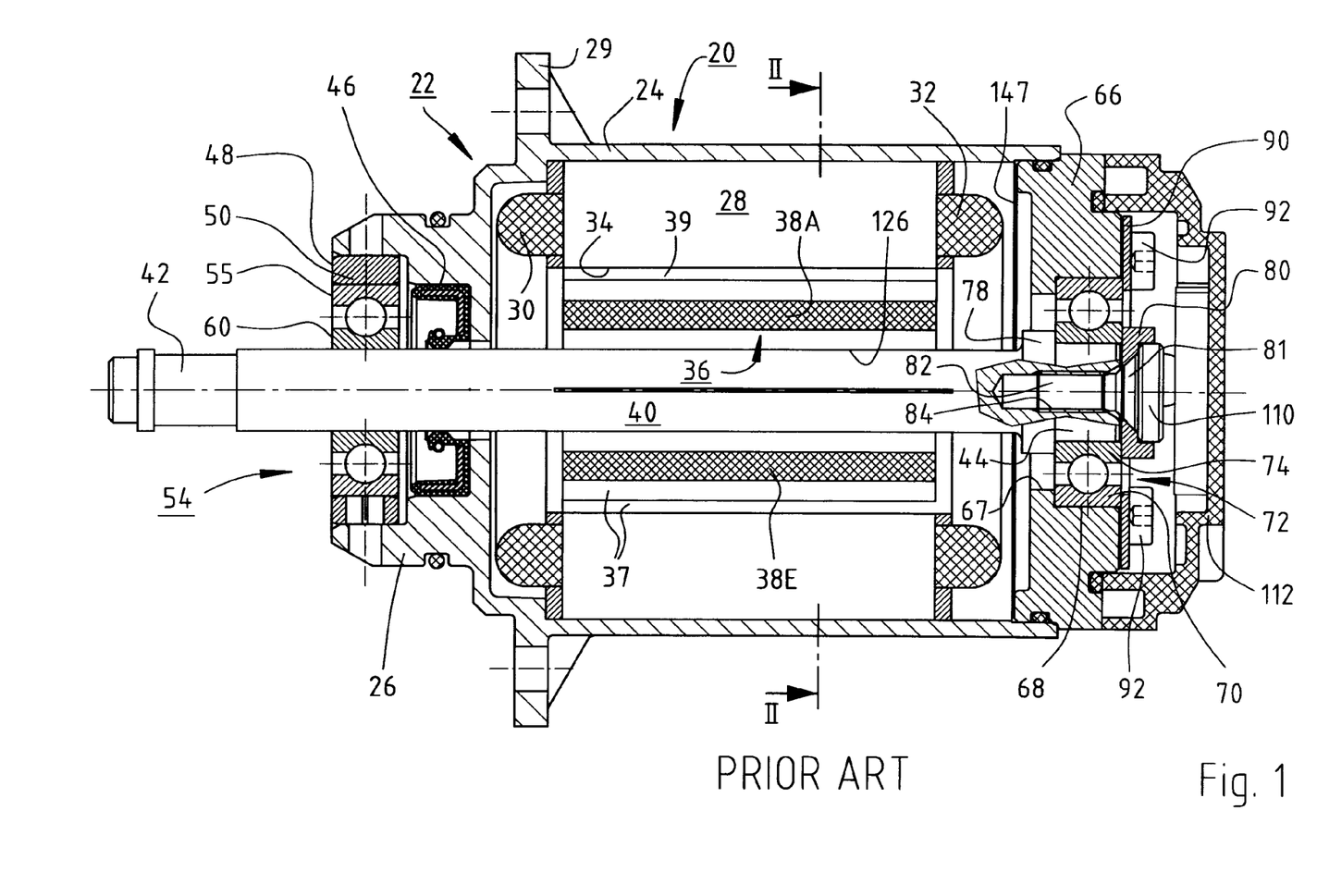
FIG. 1 is a longitudinal section through an internal-rotor motor with permanent-magnet excitation, according to the prior art.

FIG. 1 shows an electronically commutated three-phase internal-rotor motor 20 having a housing 22 that comprises a cylindrical housing part 24, an A-side bell 26, and a mounting flange 29.

Arranged in cylindrical housing part 24 is a lamination stack 27 (FIG. 2) of an external stator 28 whose end windings are indicated at 30 and 32. Stator 28 has an internal recess 34 in which an eight-pole internal rotor 36, having a lamination stack 37 made up of laminations 41 (indicated schematically in FIG. 5) and having a total of eight permanent magnets 38A to 38H (see FIG. 2), is arranged on a shaft 40 whose drive end is labeled 42 and whose internal shaft end is labeled 44. A magnetically effective air gap 39 (FIG. 4) separates stator 28 from rotor 36. A motor 20 of this kind can be referred to in various ways, for example as a "permanently-excited synchronous internal-rotor machine" or an "electronically commutated sine-wave motor" or a "three-phase motor with permanent-magnet excitation."

A seal 46 for shaft 40 is provided in A-side bell 26. Also located therein is a recess 48 in which is mounted a guide member 50 for outer ring 55 of a rolling bearing 54. Inner ring 60 of rolling bearing 54 is pressed onto shaft 40.

A B-side bell 66 is mounted in the open end of cylindrical housing part 24. This bell has a recess 68, equipped with an annular shoulder 67, for outer ring 70 of a rolling bearing 72 whose inner ring 74 is mounted on shaft end 44. Shaft 40 has for this purpose an annular collar 78 with which it abuts against the left side of inner ring 74. Abutting against its right side is a shaped part 80 made of brass that is pressed by flat head 81 of a flat-head screw 82 toward shaft 40, and is shaped approximately annularly. Screw 82 is threaded into an internal thread 84 of shaft end 44, and thereby presses shaped part 80 toward inner ring 74.

Secure clamping of outer ring 70 is provided by a part 90 that is mounted, by means of three uniformly distributed screws 92 on its periphery, onto bearing bell 66, and abuts with its radially inner part against outer ring 70 and presses it to the left against shoulder 67.

Once shaped part 80 has been mounted by means of screw 82 on shaft end 44, a control magnet 110 is mounted in a recess of shaped part 80. Said magnet is equipped on its right side (in FIG. 1) with a magnetization pattern, and serves to actuate magnetoresistive sensors (not shown) that are arranged on a housing cover 112 on the B side of motor 20, and serve to sense the rotational position of rotor 36, so that the shape and commutation of the currents in stator 28 can be exactly controlled.

Figure 2:
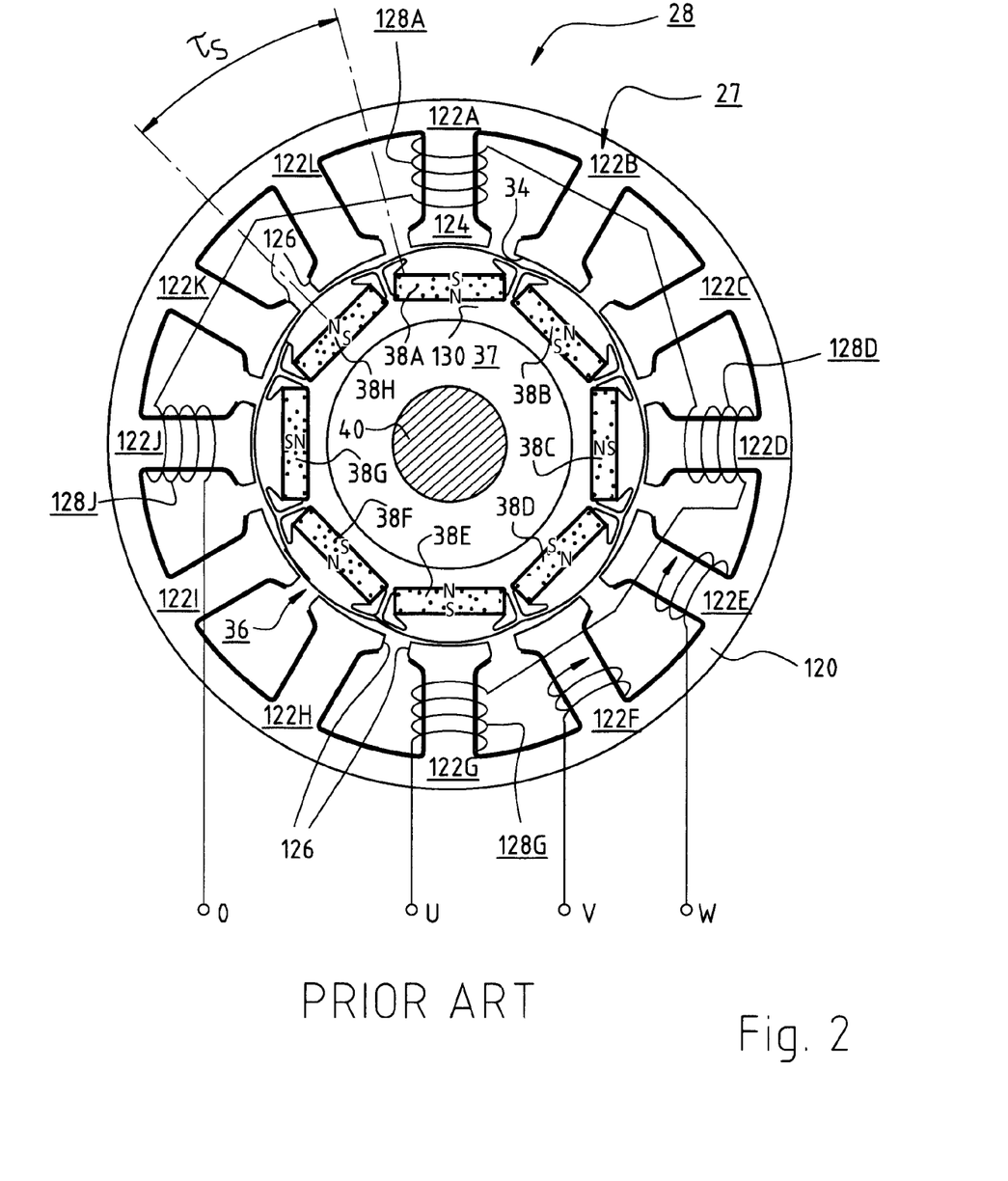
FIG. 2 is a section looking along line II-II of FIG. 1 at a scale enlarged by comparison with FIG. 1, also according to the prior art.

FIG. 2 shows, in enlarged fashion, a section looking along line II-II of FIG. 1. Magnets 38A to 38H are radially polarized. Magnet 38A has a south pole S on the outside and a north pole N on the inside. The next magnet 38B in the clockwise direction has a north pole N on the outside and a south pole S on the inside, and so on, as is evident from the drawing.

Stator lamination stack 27 has on the outside a magnetic yoke 120 from which twelve teeth 122A to 122L protrude radially inward; as depicted, they are equipped with enlarged tooth heads 124 between which slots 126 are located. In this example, the value of the slot pitch $\tau\_S$ between two adjacent stator slots 126 is $$\tau\_S = 360°/12 = 30° \text{ mech.} \tag{1}$$

Stator 28 can also, for example, be implemented with nine stator poles, and rotor 37 with six rotor poles 144 (embodiment not shown).

Teeth 122 are wound with concentrated windings. This is shown, by way of example, for phase U. This begins with a concentrated winding 128G on tooth 122G, continues into a concentrated winding 128D on tooth 122D, then into a winding 128A on tooth 122A and a winding 128J on tooth 122J. From there, strand U goes back to neutral point O if a star-configured winding is being used. A delta circuit configuration is, of course, also possible.

The sub-windings 128G, 128D, 128A, and 128J can also be connected in parallel, for example if motor 20 is being operated from a low-voltage DC source, since winding strands having a low inductance and low ohmic resistance are then obtained. Winding strands V and W are merely indicated in FIG. 2.

Rotor 36 is arranged on a shaft 40 (made of ferromagnetic material). Shaft 40 is mounted in a yoke part 130, and is part of the magnetic circuit.

Figure 3:
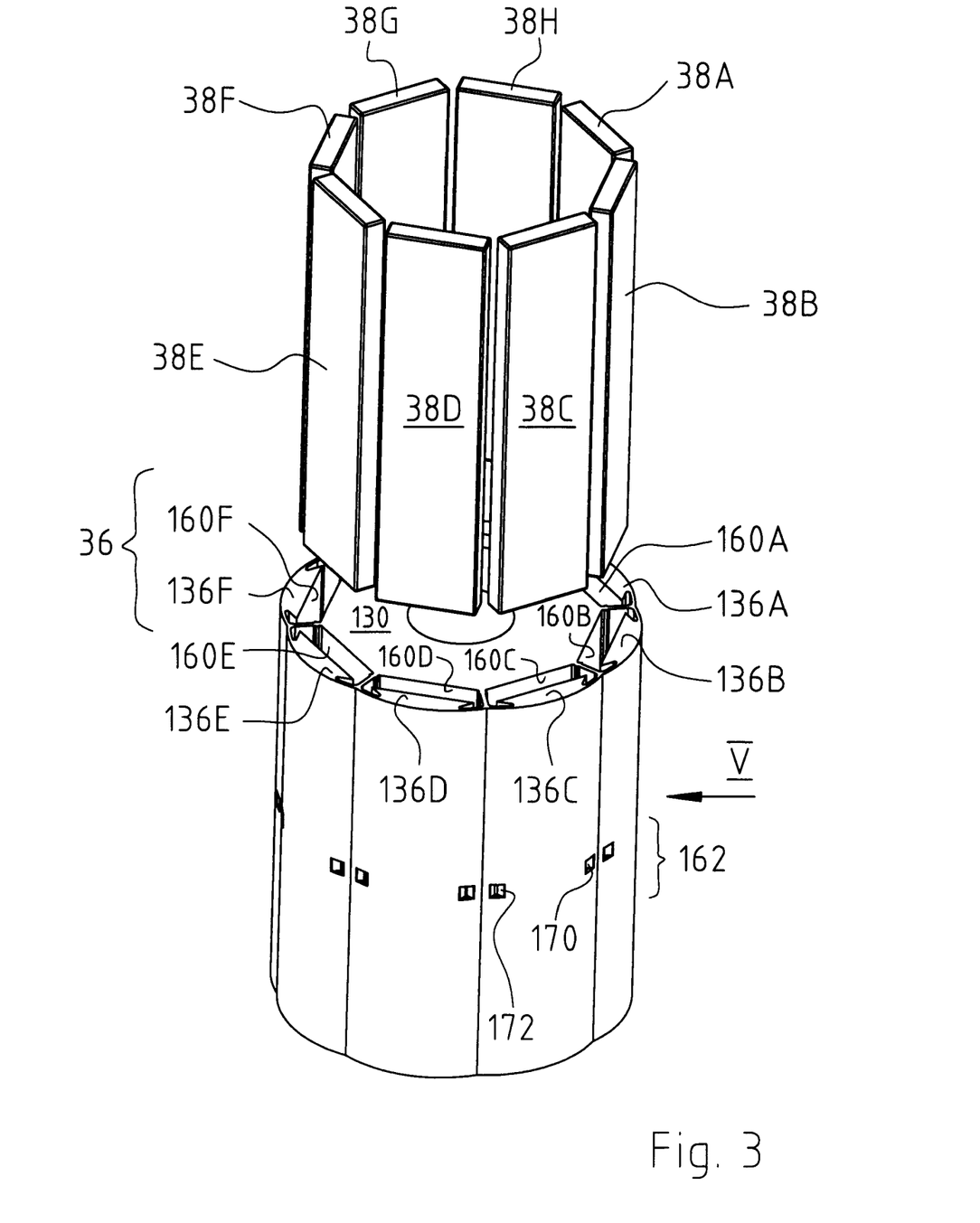
FIG. 3 is a schematic perspective view, according to the present invention, showing permanent magnets 38 of a rotor 36 before assembly by insertion of the magnets into recesses or pockets 160 of the rotor.

FIG. 3 is a perspective depiction of elements of a novel rotor 36, specifically in the lower part a lamination stack 130 having eight rotor pole shoes 136A, 136B, 136C, 136D, 136E, 136F, 136G, and 136H, of which only six pole shoes are visible in FIG. 3, and which define eight pockets or recesses 160A to 160H (FIG. 3) that serve to receive eight permanent magnets 38A to 38H. The latter are depicted in the upper part of FIG. 3 and have, for example, a rectangular cross section, and are radially magnetized (see e.g. FIG. 7 or FIG. 8).

One-piece permanent magnets 38, which are usually manufactured from magnetic ceramic material and are therefore brittle, are depicted. These can be, for example, rare-earth neodymium magnets. It would also be possible to split the magnets; for example, they could be assembled from two or three parts, although mounting in the rotor would then be somewhat more complicated.

Pole shoes 136 each have, on their side facing toward yoke 130, a boundary surface 138A, 138B, 138C, etc. that is also referred to hereinafter as a magnet/pole shoe boundary. Located opposite it, at a distance D (FIG. 4), is a boundary 140A, 140B, 140C, etc. that extends between a magnet 38 and yoke 130.

Permanent magnets 38A, 38B, etc. are clamped in elastically between these boundaries 138, 140, as will be described later on, with reference to FIGS. 6 to 8.

Figure 7:
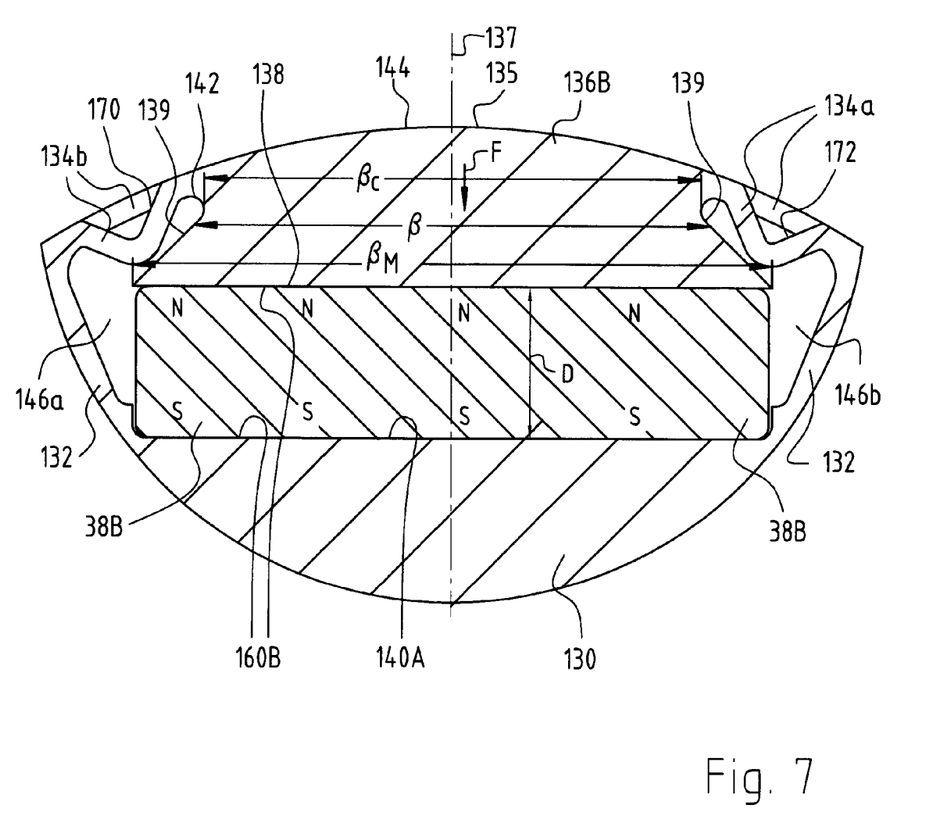
FIG. 7 is an enlarged view of detail VII of FIG. 6.

As FIG. 7 shows, magnet 38 has at its magnet/pole shoe boundary surface 138 an angular extent $\beta\_M$, and this corresponds approximately to the size of pole shoe 136 abutting against that boundary surface. Proceeding outward in a radial direction from this magnet/pole shoe boundary surface 138, the width $\beta$ of pole shoe 136 then decreases on both sides along a flank 139, and at a point 142 reaches its minimum width $\beta\_C$ which is less than $\beta\_M$ (see FIG. 7).

Approximately radially outside point 142, pole shoe 136 is connected laterally, via the peripherally extending segments or holding parts 134a, 134b (which are magnetically saturated during operation and therefore perform principally a mechanically supporting function), to carrier parts 132 that extend radially and connect holding parts 134a, 134b, and, by way of them, pole shoe 136 (FIG. 4), to magnetic yoke 130.

Figure 4:
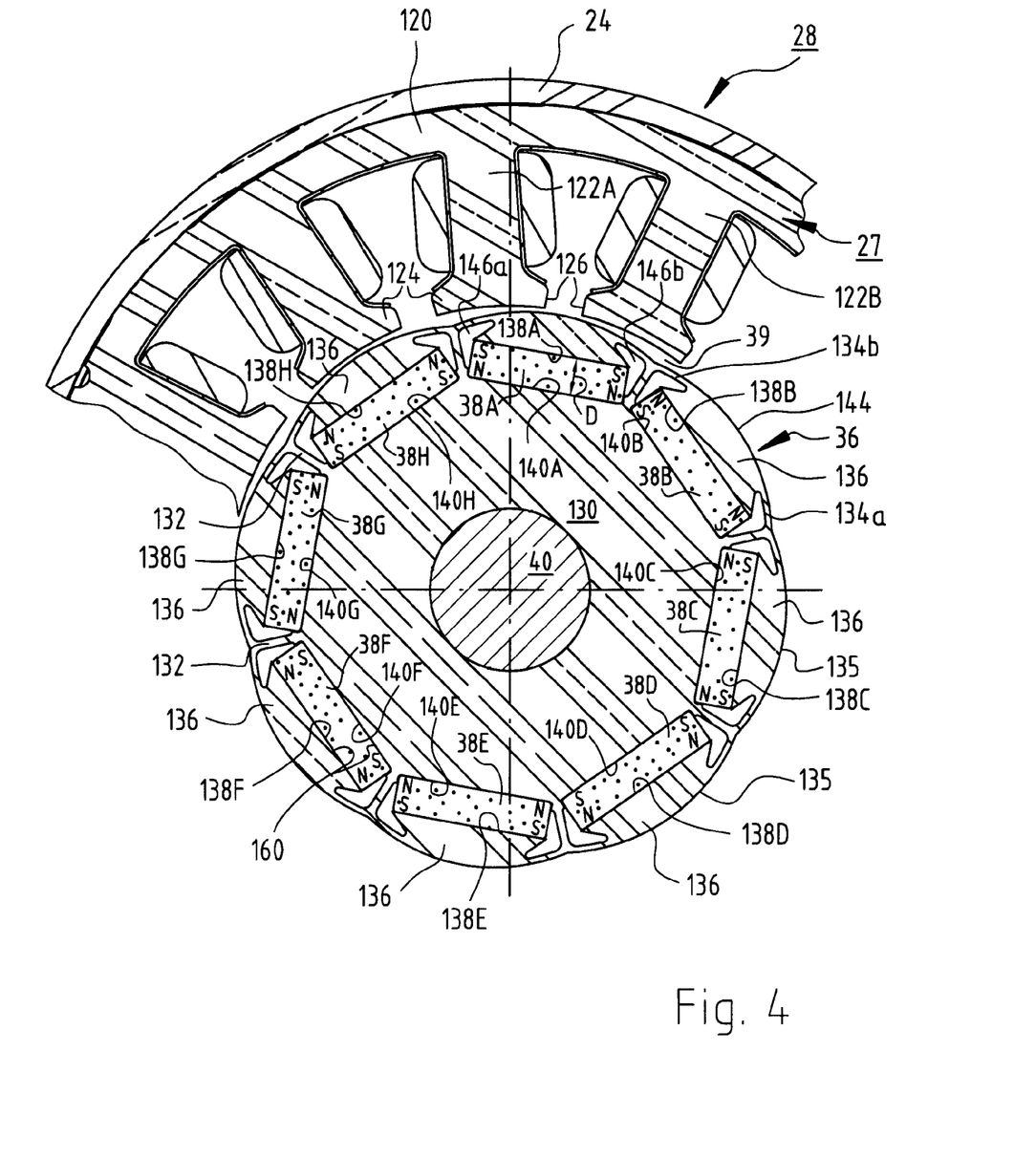
FIG. 4 shows a variant of FIG. 2.

As FIG. 4 shows, radially outer side 144 of a respective pole shoe 136 is so configured that an approximately sinusoidal flux distribution is created in magnetically effective air gap 39, i.e. proceeding from center 135 of a rotor pole 136, the diameter decreases to either side as depicted. This profile is usually determined empirically.

Located on either side (circumferentially) of a permanent magnet 38 is a respective cavity 146a, 146b whose cross-sectional shape is approximately similar to a boomerang, i.e. a right triangle whose long side bulges slightly inward, since a radially outer corner of permanent magnet 38 protrudes somewhat into said cavity 146a at that point.

Normally, a rotor topology like this would be unfavorable, and would result in a rather rectangular flux distribution in magnetically effective air gap 39 and a high cogging torque. But, because of constriction 142 (FIG. 7) of pole shoes 136, causing angle $\beta\_C$ to be less than $\beta\_M$, a flux distribution is obtained which gives a good approximation of a sine wave.

Constrictions 142 not only produce a concentration of magnetic flux toward the center of the pole, but also act as magnetic resistors that enable a small magnetic flux, even adjacent the pole gaps between rotor poles 136, as is desirable for a sinusoidal flux distribution. This lateral flux can be influenced by appropriate dimensioning of cavities 146.

Figure 6:
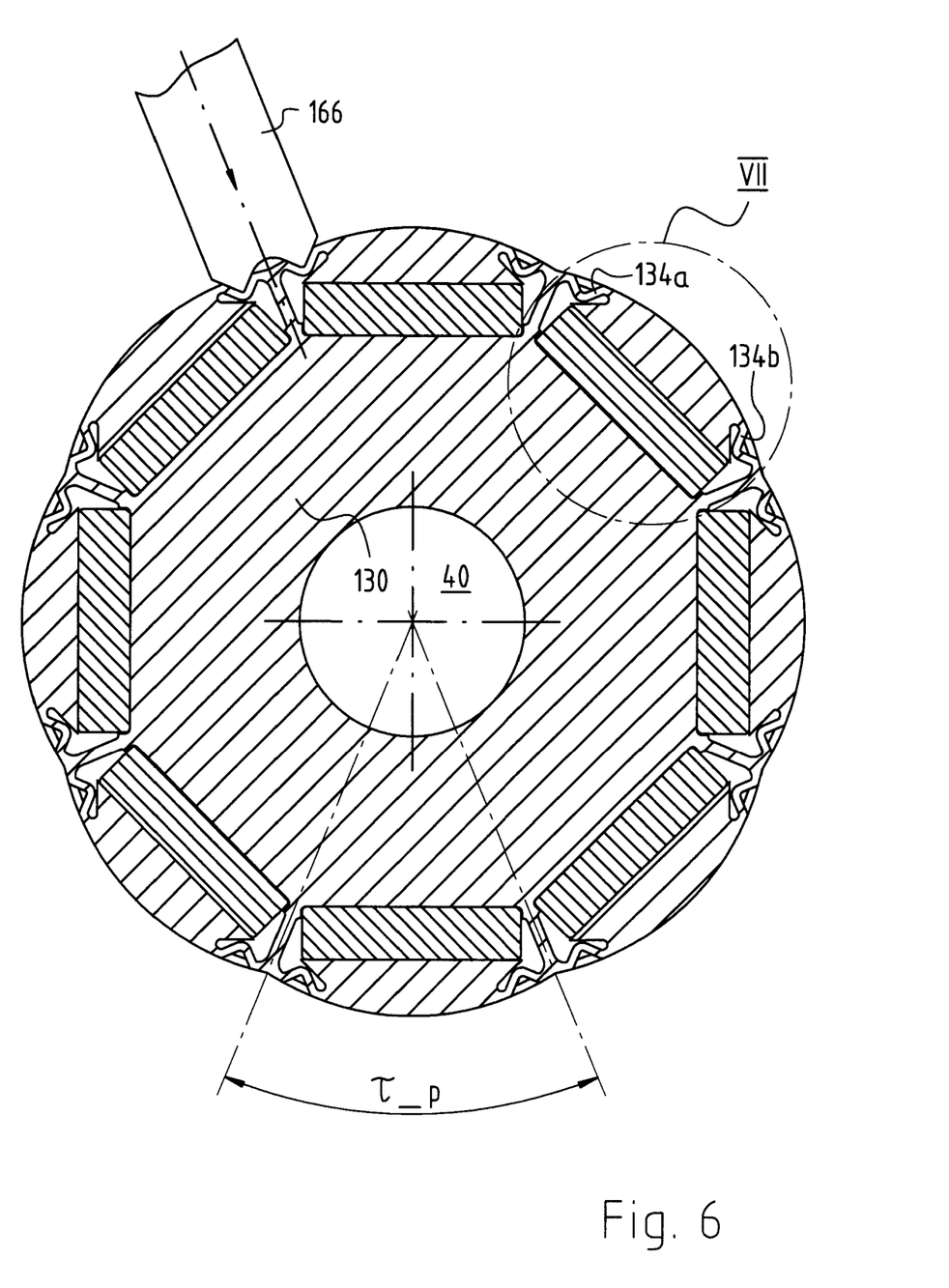

FIGS. 3, 6, and 7 illustrate the novel structure of the invention, for fastening permanent magnets 38 into pockets or recesses 160 of rotor 36.

As already explained, magnets 38 must not rattle or fall out, even at higher speeds, i.e. they must be securely fastened, both axially and radially.

For this purpose, magnets 38 can be adhesively bonded into rotor 36, or a washer (not shown) can additionally be pressed onto shaft 40 at both ends of rotor 36. Rotor 36 could also be encapsulated in synthetic resin. All these methods, however, require additional time, as well as auxiliary materials, workstations with air extraction, etc. The present invention achieves the same objective more economically.

In the case of the present motor, magnets 38 are elastically clamped, at segments 162, between the associated pole shoe (e.g. 136B in FIG. 7) and magnetic yoke 130. This is achieved by the fact that, on longitudinal segments 162 (FIGS. 3 and 5) of rotor 36 and for some rotor laminations 41, holding segments 134a, 134b, whose original shape is evident e.g. from FIG. 4, are indented (or notched or crimped) radially inward, using a tool 166 that is shown schematically in FIGS. 6 and 8; this produces curved segments 170, 172 there that deform these holding segments 134a, 134b into the vicinity of the local flanks 139 of pole shoe 136.

If, for example, rotor laminations 41 having a thickness of 0.35 mm are used on a rotor 36, experiments have shown that deforming the holding segments 134a, 134b of fewer than ten laminations 41 is sufficient to retain magnets 38 securely, i.e. segments 162 were in this case, for example, approximately two to four millimeters long. Their length of course depends on the size and power output of motor 20. If applicable, multiple such segments 162 can also be used, for example at the beginning, middle, and end of a rotor. It is, of course, also possible to use thicker rotor laminations 41, e.g. having a thickness of 0.5 mm or more.

The indentations (or notches or crimps) 170, 172 produce a radially inwardly acting force F (FIGS. 7, 8) on the relevant pole shoe 136, and this force F securely retains each permanent magnet 38 in its recess 160, so that it cannot either rattle or fall out.

A considerable reduction in assembly time also results, and the risk of damage to magnets 38 is eliminated, since indentation 170, 172 acts not directly on magnets 38, but rather on their holding segments 134a, 134b which, in addition to their supporting function, now also take on the further function of a spring that generates force F.

Magnets 38 are preferably inserted into recesses 160 before holding segments 134a, 134b are deformed.

Figure 8:
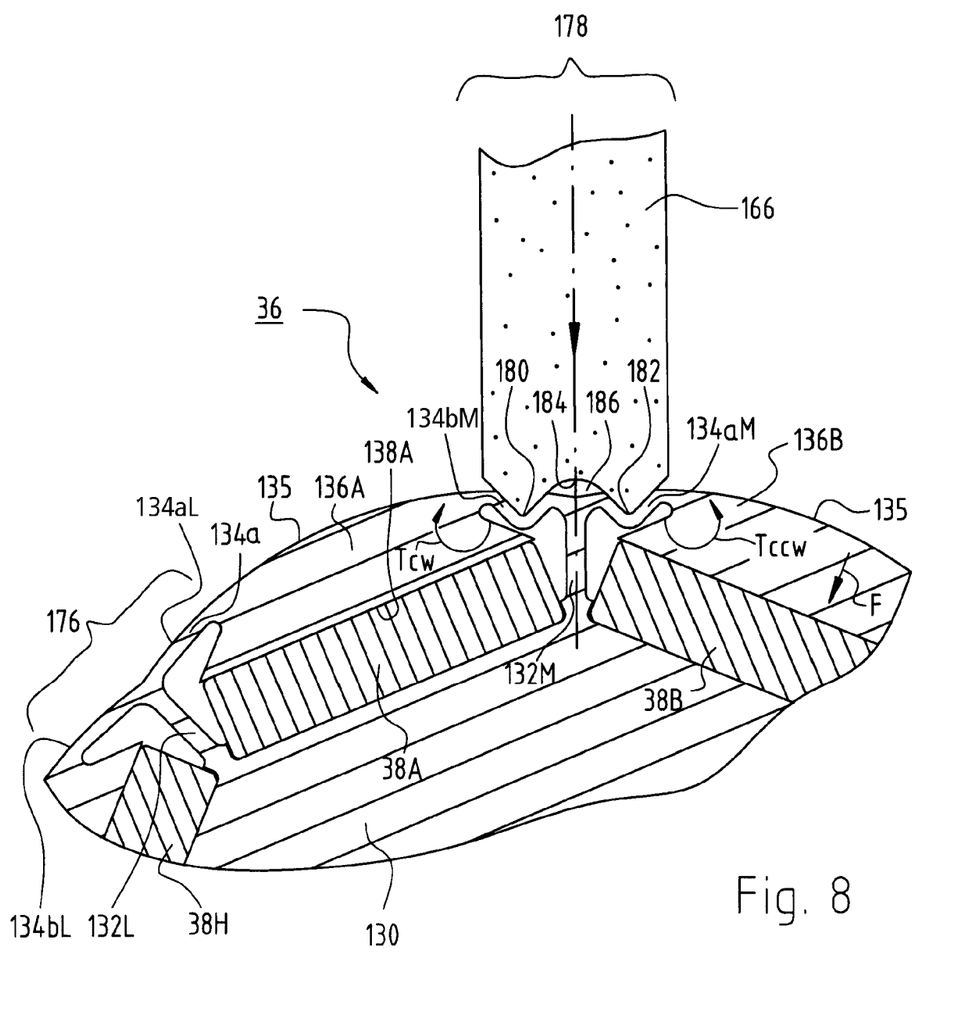
FIG. 8 is an enlarged view of an example of a tool.

The enlarged view of FIG. 8 is provided for better comprehension.

The left side shows, at 176, the rotor shape according to FIGS. 1 and 2. Here pole shoe 136A, below which rotor magnet 38A is located, is connected rigidly on its left side, by way of a substantially straight holding part 134aL, to the radially extending carrier part 132L and, by way of that, to yoke 130.

These parts thus together constitute a part that can be regarded as a rigid shell which forms an outer wall 138A of the cavity for magnet 38A.

FIG. 8 shows at 178, in contrast thereto, the deformation of the middle (in FIG. 8) holding parts 134aM and 134bM by tool 166.

Tool 166 has, for this purpose, at its working end, i.e. at the bottom in FIG. 8, two projections 180, 182 between which is a depression 184, so that tool 166 is approximately "W"-shaped at its working end.

Depression 184 forms a cavity 186 that constitutes a separation between the radially outer end of carrier part 132M and tool 166, so that the latter can produce no (or only a little) upsetting or crimping of carrier part 132M.

Projection 180, on the other hand, produces an indentation of holding part 134bM, and projection 182 produces an indentation of holding part 134aM, as depicted in greatly enlarged fashion in FIG. 8.

This creates, at the left end of holding part 134bM, a torque Tcw on the right end of pole shoe 136A, which torque presses the shoe elastically onto permanent magnet 38B.

At the right end of holding part 134aM, a torque is likewise created on the left end of pole shoe 136B, which torque presses the shoe elastically onto permanent magnet 38B.

The W-shaped deformation of holding parts 134a, 134b thus additionally causes them to become active as springs that elastically retain magnets 38 in their recesses.

Because these torques, just described, act on both ends of a permanent magnet, each in an opposite direction, the permanent magnet is securely retained in the rotor.

It is useful to proceed in such a way that, during manufacture of the rotor, the necessary number of tools 166 is used in each case.

Figure 5:
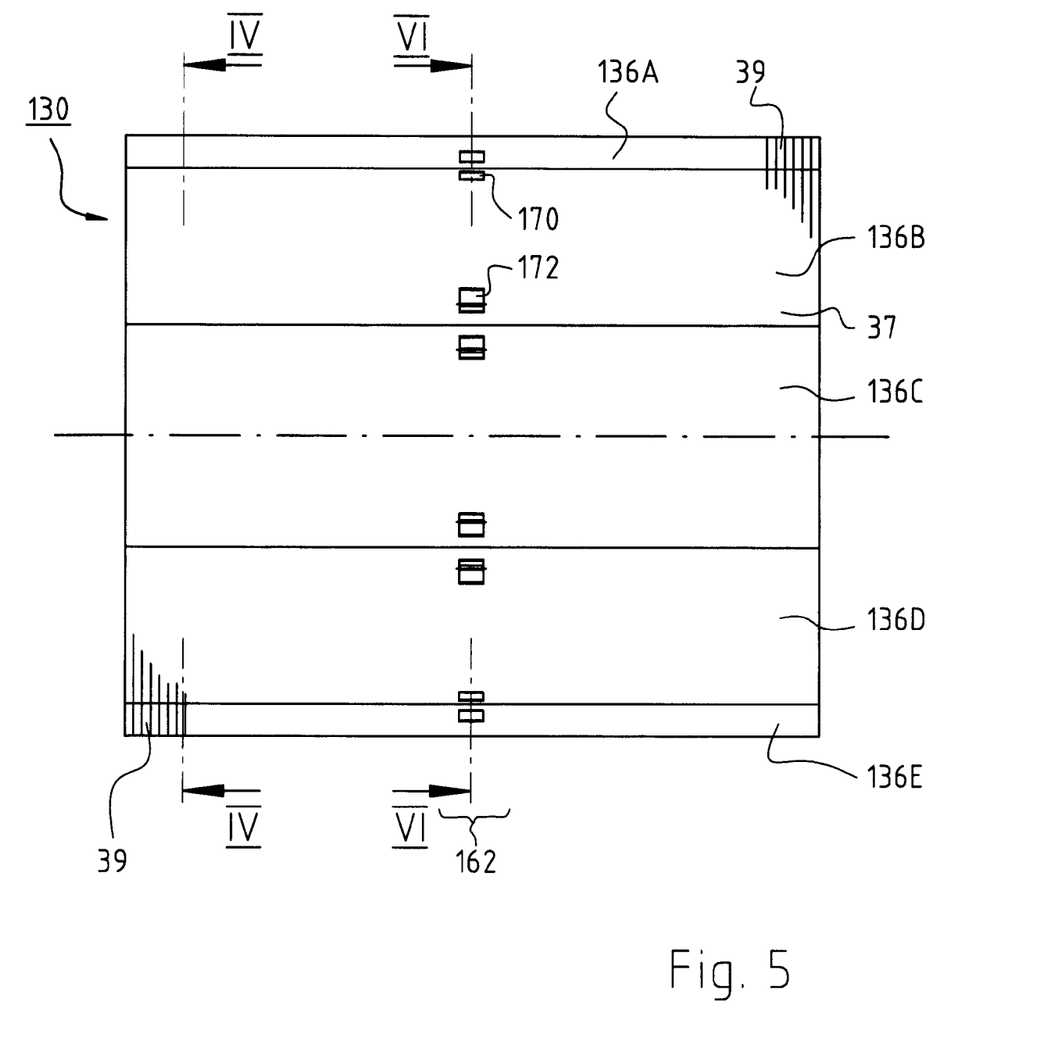
FIG. 5 is a side view of rotor lamination stack 130, looking in the direction of arrow V of FIG. 3.

In the exemplifying embodiment, rotor 36 has eight permanent magnets 38, and the rotor is therefore placed into an apparatus having eight tools 166 that are simultaneously actuated, and thereby simultaneously deform all the holding parts 134a, 134b so that all eight permanent magnets 38 are simultaneously elastically mounted, in a single working step, in rotor region 162 (FIG. 5).

Figure 9:
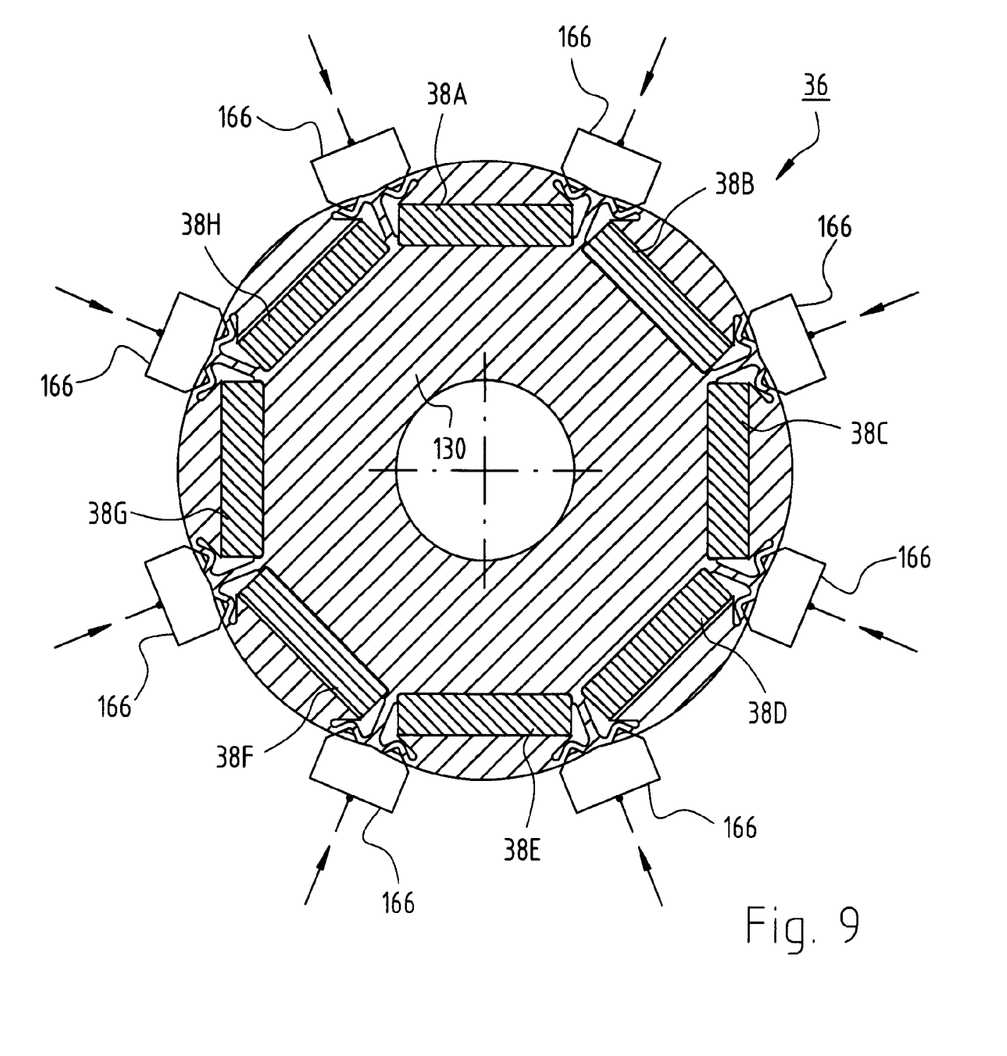
FIG. 9 is a schematic view to explain the mounting of the rotor magnets.

FIG. 9 schematically shows this preferred manner of mounting magnets 38A to 38H in the lamination stack of rotor 36.

This entails the use of eight tools 166 that are arranged around rotor 36 and are moved simultaneously, by means of a suitable drive system (not shown), toward rotor 36, in order to produce identical deformations of holding members 134a, 134b, as shown in FIG. 8 by way of example.

Upon deformation, the holding members are bent over at the location where they are connected to the associated pole shoe (in FIG. 8: pole shoes 136A and 136B). Holding members 134aM, 134bM spring back slightly after this bending operation, and this rebound produces the torques Tcw (clockwise torque) and Tccw (counterclockwise torque) indicated in FIG. 8, which generate forces F that clamp magnets 38 in place.

Many variants and modifications are, of course, possible within the scope of the present invention.

What is claimed is:

1. An electric motor comprising:
a stator (28) having a stator lamination stack (27) defining a plurality of slots (126);
a stator winding (U, V, W) arranged in said slots (126);
a rotor (36) separated from the stator (28) by a magnetically effective air gap (39), which rotor includes, on its side facing toward said air gap (39), a plurality of salient poles (136A, 136B, . . . ) having pole shoes (136) facing toward said air gap (39), and on its side facing away from the air gap (39)
a magnetic yoke (130) that is mechanically connected to the pole shoes (136) by respective holding segments (132, 134a, 134b);
a respective recess (160) formed between the magnetic yoke (130) and a respective pole shoe (136), in which recess, in order to generate a magnetic flux in said pole shoe (136), at least one permanent magnet (38) is arranged, thereby defining a respective magnet/pole shoe boundary (138) at each transition from said permanent magnet to the associated pole shoe,
and which recess (160) is adjoined, on each circumferential side of the at least one permanent magnet (38) by a region (146a, 146b) of poor magnetic conductivity that is contiguous, on its side facing toward the air gap (39), with one of the holding segments (134a, 134b),
wherein
the width (β), measured in a circumferential direction, of a pole shoe (136) decreases, at least locally, in a direction away from the magnet/pole shoe boundary (138) toward the air gap (39) in a transition zone to a point (142) of least pole shoe width,
in said transition zone, a pole shoe (136) defines, on each of its sides facing toward the adjacent pole shoe (136), a flank (139), and
the holding segments (134a, 134b) are configured as spring elements that mechanically urge the pole shoes (136) in a direction toward the associated permanent magnets (38), in order to retain said permanent magnets in the recesses (160) provided for them.

2. The motor according to claim 1, in which
at least the majority of the holding segments (134a, 134b) configured as spring elements do not touch the flank (139), located respectively opposite them, of a pole shoe (136).

3. The electric motor according to claim 1, in which
the width ($\beta\_M$), measured in a circumferential direction, of a pole shoe (136) is greater at the magnet/pole shoe boundary (138) than its width ($\beta\_C$) at a point (142) at which said width is smallest.

4. The electric motor according to claim 1, in which
the at least one rotor magnet (38) that is arranged in the recess (160) provided between the magnetic yoke (130) and the pole shoe (136) has, on its side facing toward the yoke (130), an angular extent that is at least equal to 85% of a pole pitch ($\tau\_P$) of the rotor (36).

5. The electric motor according to claim 4, in which
the angular extent is at least equal to 95% of a pole pitch ($\tau$)_P) of the rotor (36).

6. The electric motor according to claim 1, in which
the stator winding (U, V, W) comprises concentrated windings (128G).

7. The electric motor according to claim 1,
which is implemented as an internal-rotor motor.

8. The electric motor according to claim 1, in which
the at least one permanent magnet is implemented as a ceramic magnet (38).

9. The electric motor according to claim 1, in which
a carrier part (132) is arranged between two adjacent rotor poles (135), which part extends toward the air gap (39) and from whose radially outer region there extends at least one holding segment (134a, 134b) to the pole shoe (136) of an adjacent rotor pole (135), which holding segment (134a, 134b) is formed with a notch (170, 172) to yield a spring member that mechanically urges said pole shoe (136) in a direction away from the magnetically effective air gap (39).

10. The electric motor according to claim 9, in which
a holding segment (134a, 134b) extends from the radially outer region of the carrier part (132) to each of the two adjacent pole shoes (136), which holding segments (134a, 134b) are each formed with an indentation (170, 172) to yield a spring member that acts upon the associated pole shoe (136) in a direction away from the magnetically effective air gap (39).

11. The electric motor of claim 8, wherein
a magnetically active constituent of said magnet is a rare earth metal.

12. The electric motor of claim 11, wherein said rare earth metal comprises neodynium.

* * * * *